(12) United States Patent
Cillierre et al.

(10) Patent No.: US 7,967,385 B2
(45) Date of Patent: Jun. 28, 2011

(54) HINGE MECHANISM AND VEHICLE SEAT COMPRISING SUCH A MECHANISM

(75) Inventors: Francois Cillierre, La Selle la Forge (FR); Sandra Bidet, Aunay sur Odon (FR)

(73) Assignee: Faurecia Sieges d'Automobile, Nanterre (FR)

( * ) Notice: Subject to any disclaimer, the term of this patent is extended or adjusted under 35 U.S.C. 154(b) by 103 days.

(21) Appl. No.: 12/403,122

(22) Filed: Mar. 12, 2009

(65) Prior Publication Data

US 2009/0236892 A1    Sep. 24, 2009

(30) Foreign Application Priority Data

Mar. 18, 2008  (FR) ...................... 08 51742

(51) Int. Cl.
*B60N 2/235* (2006.01)
*B60N 2/42* (2006.01)
(52) U.S. Cl. ............... 297/367 P; 297/216.13
(58) Field of Classification Search ........... 297/367 P, 297/367 R, 216.13; 16/235, 239
See application file for complete search history.

(56) References Cited

U.S. PATENT DOCUMENTS

| | | | |
|---|---|---|---|
| 6,325,458 B1 | 12/2001 | Rohee et al. | |
| 6,328,383 B2 * | 12/2001 | Rohee et al. | 297/367 R |
| 6,554,361 B2 * | 4/2003 | Reubeuze et al. | 297/367 R |
| 6,561,585 B2 * | 5/2003 | Cilliere et al. | 297/367 R |
| 2002/0096923 A1 | 7/2002 | Uramichi | |
| 2003/0025376 A1 | 2/2003 | Moriyama et al. | |
| 2006/0145523 A1 | 7/2006 | Yamada | |

FOREIGN PATENT DOCUMENTS

| | | |
|---|---|---|
| EP | 1 225 086 | 7/2002 |
| EP | 1 279 553 | 1/2003 |
| FR | 2 790 230 | 9/2000 |
| FR | 2 869 847 | 11/2005 |
| JP | 2006-255173 | 9/2006 |

OTHER PUBLICATIONS

French Search Report from priority application No. FR 0851742; Report dated Jan. 1, 2009.
The Korean Intellectual Property Office Notice of Office Action dated Feb. 21, 2011 issued for the corresponding Korean patent application No. 10-2009-0023243.

* cited by examiner

*Primary Examiner* — Milton Nelson, Jr.
(74) *Attorney, Agent, or Firm* — Miller, Matthias & Hull, LLP

(57) ABSTRACT

Hinge mechanism comprising first and second frames connected together by an adjustment device comprising a first set of gear teeth integral with the first frame and a first mobile toothed component engaging with the first set of gear teeth. The second frame comprises a second set of gear teeth, which interferes with the first frame when the torque applied between the first and second frames exceeds a predetermined threshold, in order to immobilize the frames rotatably in relation to each other.

7 Claims, 3 Drawing Sheets

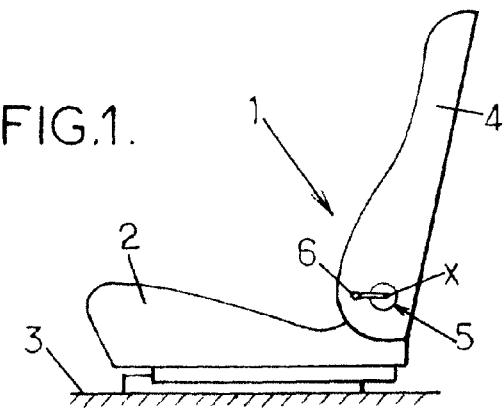
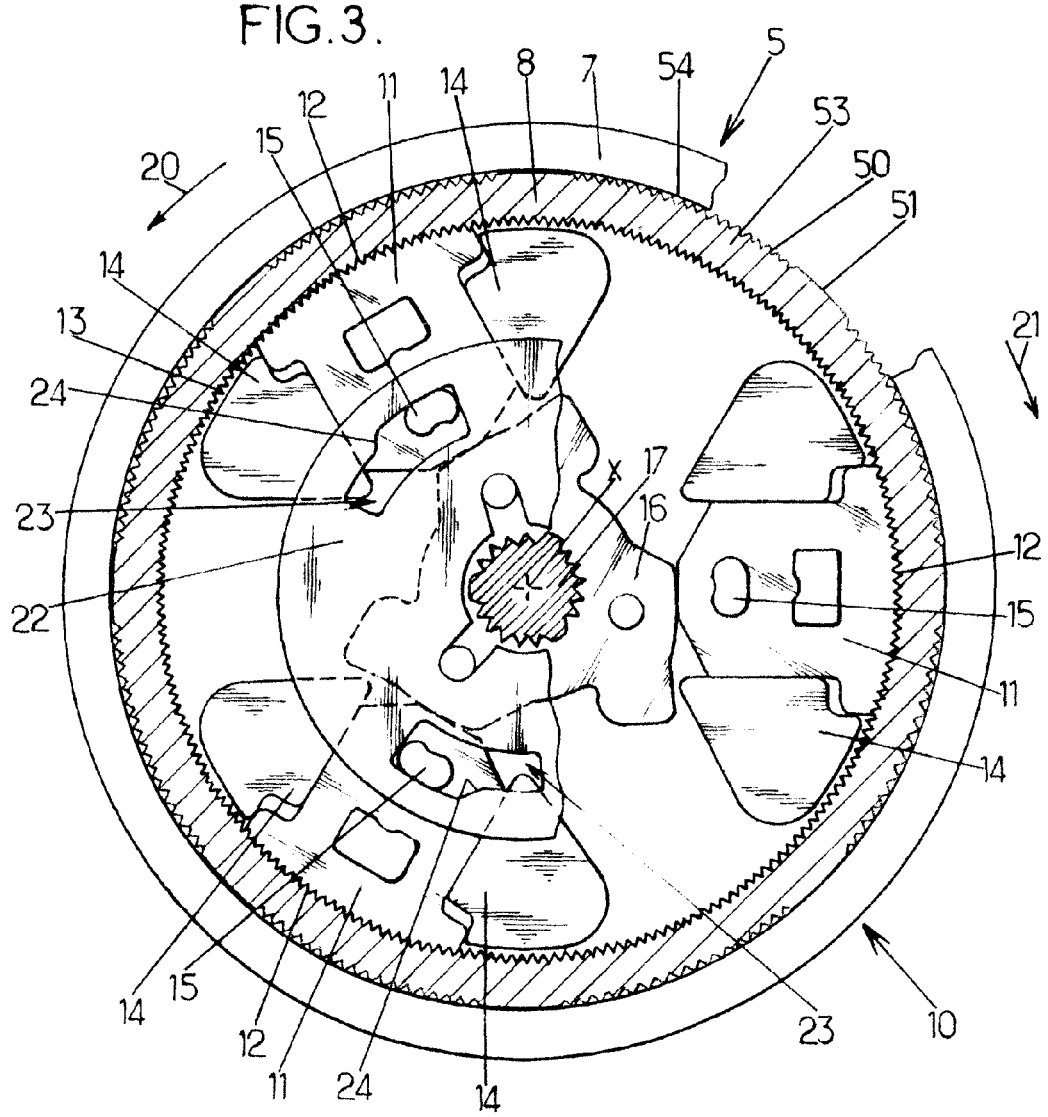

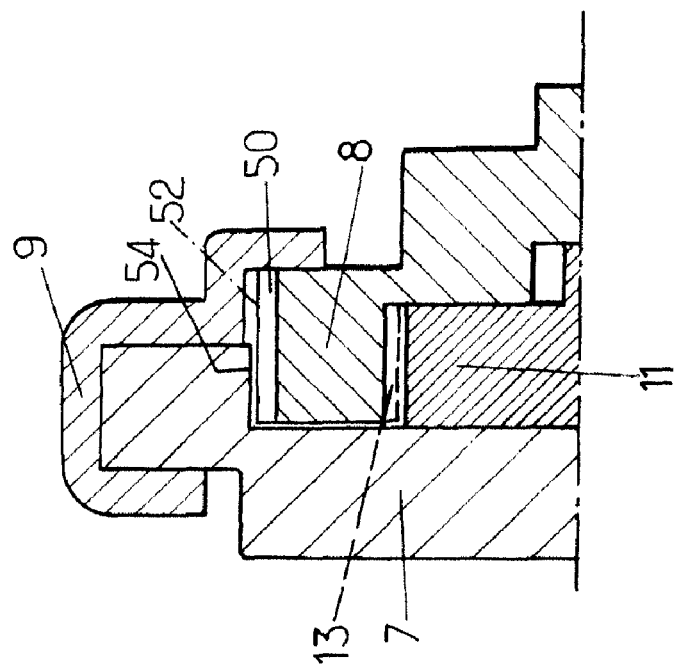
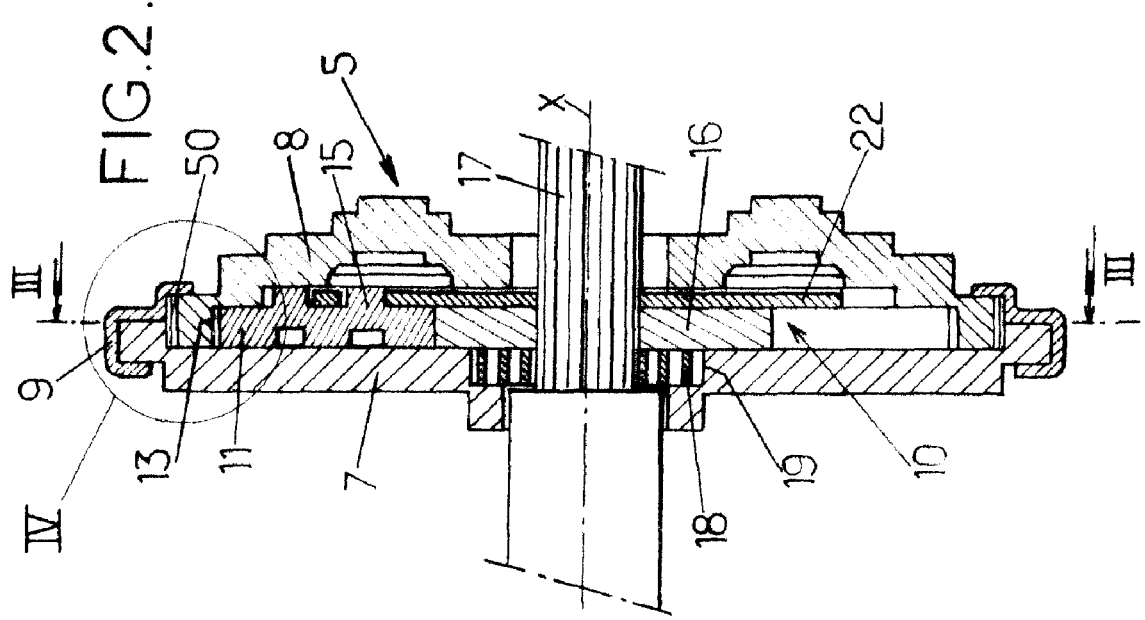

HINGE MECHANISM AND VEHICLE SEAT COMPRISING SUCH A MECHANISM

CROSS-REFERENCE TO RELATED APPLICATIONS

This application claims priority under the Paris Convention to French Patent Application No. 08 51742, filed on Mar. 18, 2008.

FIELD OF THE DISCLOSURE

The present invention relates to hinge mechanisms for vehicle seats and seats comprising such mechanisms.

BACKGROUND OF THE DISCLOSURE

More particularly, the invention relates to a hinge mechanism comprising:
  first and second frames rotatably mounted in relation to each other about an axis of rotation,
  a geared adjustment device connecting the first and second frames together to allow adjustment of a relative angular position of said first and second frames, said adjustment device comprising:
    at least one first set of gear teeth integral with the second frame, and forming at least one arc of a circle centered on the axis of rotation,
    at least one first toothed component capable of engaging with said first set of gear teeth and mobile in relation to said first frame, between on the one hand a locking position in which it cooperates with the first set of gear teeth of the second frame in order to immobilize the first and second frames in relation to each other and on the other hand, a retracted position in which said locking component does not interfere with the gear teeth of the second frame,
    and an actuation device capable of controlling the adjustment device.

FR-A-2 790 230 describes an example of such a hinge mechanism, comprising moreover overlooking elements held by the first frame that interfere with the second frame when the torque applied between the first and second frames exceeds a predetermined threshold when the actuation device is idle, in order to immobilize the first and second frames rotatably in relation to each other with increased resistive torque.

This hinge mechanism gives complete satisfaction. In particular, the action of the overlooking elements makes it possible to increase the mechanical strength of the hinge mechanism, in particular in the event of a road accident when this mechanism is used in a vehicle seat. However, this principle requires the installation of additional parts in the first frame.

SUMMARY OF THE DISCLOSURE

The purpose of the present invention is to improve the hinge mechanisms of the type mentioned above, in particular in order to propose an arrangement which is simpler to produce and less costly, while giving equally good performance.

To this end, according to the invention, a hinge mechanism of the type in question is characterized in that the second frame comprises moreover at least one second set of gear teeth forming at least one arc of a circle centered on the axis of rotation and capable of interfering with the first frame, when the torque applied between the first and second frames exceeds a predetermined threshold when the actuation device is idle.

As a result of these arrangements, in the event of very significant forces experienced during a accident involving the vehicle in which a seat using the hinge in question is used, the second set of gear teeth cooperates with the first frame to increase the resistive torque in order to prevent a relative movement of the frames in relation to each other.

In different embodiments of the hinge mechanism according to the invention, it is moreover possible, optionally, to make use of one and/or another of the following arrangements:
  the first frame comprises a cylindrical bearing in which a ring that forms part of the second frame is rotatably mounted, said ring having a radially internal face that includes the first set of gear teeth and a radially external face that includes the second set of gear teeth, said second set of gear teeth being capable of entering the cylindrical bearing under pressure exerted by the first toothed component when the torque applied between the first and second frames exceeds a predetermined threshold;
  the second set of gear teeth comprises several arc-shaped sections angularly separated by smooth arc-shaped bearing surfaces, said bearing surfaces resting slidably on the cylindrical bearing of the first frame and being capable of preventing the second set of gear teeth from interfering with the first frame, while the torque applied between the first and second frames is below said predetermined threshold;
  the bearing surfaces define and form part of a circumscribed cylinder having a first radius and the second set of gear teeth has radial points of teeth defining a circle having a second radius being at most equal to the first radius;
  the second radius is equal to the first radius;
  there are three first toothed components, spaced circumferentially and distributed at an angle of 120° degrees, and the bearing surfaces are spaced and distributed at an angle of 45° around the circumscribed cylinder;
  the second set of gear teeth and the cylindrical bearing each have a surface hardness coefficient, the surface hardness coefficient of the cylindrical bearing being lower than the surface hardness coefficient of the second set of gear teeth.

Moreover, a subject of the invention is also a vehicle seat comprising a seat base and a backrest mounted pivotably in relation to the seat base by means of at least one hinge mechanism as previously defined.

BRIEF DESCRIPTION OF THE DRAWINGS

Other characteristics and advantages of the invention will become apparent during the following description of one of its embodiments, given by way of a non-limitative example, with reference to the attached drawings.

On the drawings:
FIG. 1 shows a vehicle seat capable of being equipped with a hinge mechanism according to the invention,
FIG. 2 is an axial cross-sectional view of the hinge mechanism according to the invention, capable of equipping the seat in FIG. 1, said hinge mechanism being in the normal idle position,
FIG. 3 is a cross-sectional view along the line III-III of the hinge mechanism in FIG. 2, with a partial cutaway,
FIG. 4 is a detailed cross-sectional view of zone IV of the hinge mechanism in FIG. 3.

Figure 6:
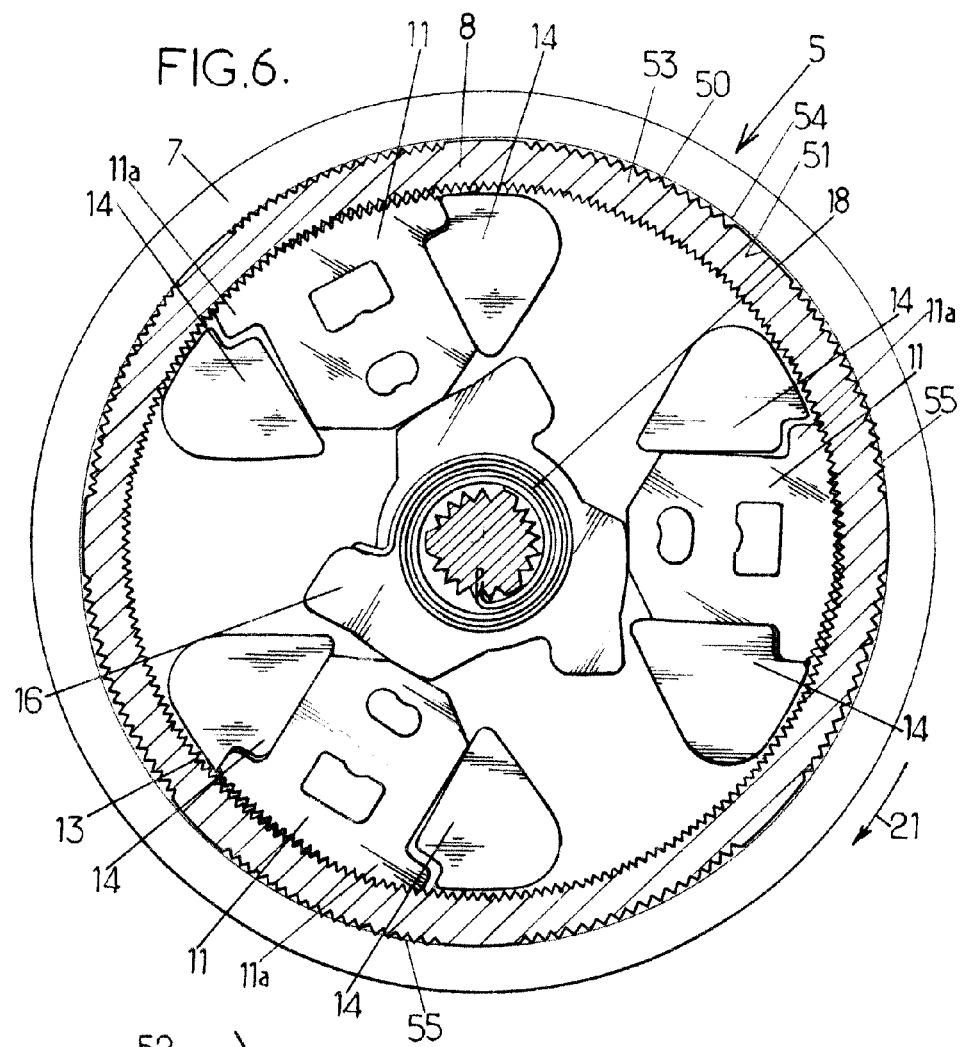
FIG. 6 is a view similar to that in FIG. 3, showing the hinge mechanism after an accident experienced by the vehicle in which the seat is installed.

The same references in different figures denote identical or similar components.

DETAILED DESCRIPTION

FIG. 1 shows a vehicle seat 1, for example a front seat of a motor vehicle, that comprises a seat base 2 fixed on the floor 3 of the vehicle, for example by means of longitudinal runners, and a backrest 4 mounted pivotably in relation to the seat base 2 about a horizontal transverse axis of rotation X, by means of at least one hinge mechanism 5 controlled for example by a handle 6 or similar.

As shown in FIGS. 2 and 3, the hinge mechanism 5 comprises:

- a metal frame 7 which in this case is fixed and rigid with the seat base 2 of the seat,
- a metal frame 8 which in this case is mobile and rigid with the backrest 4 of the seat 1,
- a metal ring 9 (not shown in FIG. 3) which is crimped onto the circumference of the fixed and mobile frames 7, 8 delimiting together with the latter a closed circular unit,
- and a locking device 10 that is contained in this casing and which is capable of immobilizing the mobile frame 8 in relation to the fixed frame 7 while the lever 6 is not actuated.

In a manner known per se, this locking device 10 can for example comprise:

- at least one and preferably three metal locking toothed components 11 (more generally there can be N locking components 11, N being comprised between 1 and 6 and preferably between 3 and 6) which are arranged at 120 degrees to each other and each have a set of external gear teeth 12 capable of engaging with a first set of circular internal gear teeth 13 arranged in the mobile frame 8, each of these locking toothed components 11 being mounted so as to slide radially in a guide formed by two stop elements 14 that frame the component 11 in the circumferential direction and which are rigid with the fixed frame 7, the locking toothed components 11 being thus movable between, on the one hand, a locking position in which the set of gear teeth 12 of these components is engaged with the set of gear teeth 13 of the mobile frame 8 to lock the hinge mechanism, and on the other hand, a retracted position in which the locking toothed components do not cooperate with the set of gear teeth of the mobile frame 8, each component comprising moreover at least one pin 15 which projects axially toward the mobile frame 8,
- a metal cam 16 that is rotatably rigid with a control shaft 17 itself rigid with the control lever 6, this cam 16 controlling the sliding of the locking toothed components 11,
- a spring 18 that is mounted for example in a stamped recess 19 formed in the fixed frame 7 and that acts on the control shaft 17 and the cam 16 in the angular direction 20 towards an idle position in which said cam places the locking components 11 in their locking position, said cam 16 being capable of pivoting in the opposite angular direction 21 under the action of the control lever 6, allowing the locking components to slide towards their retracted positions in order to thus unlock the hinge mechanism 5,

- and a rigid metal plate 22 that is rotatably linked to the cam 16 and that extends radially between said cam 16 and the mobile frame 8 partially covering the locking toothed components 11, this plate 22 comprising three cut-outs 23 in which the pins 15 of the components 11 are engaged, each of these pins 15 cooperating with a cam edge 24 that delimits the corresponding cut-out radially outwards and that is shaped to move the corresponding locking toothed component 11 radially inwards when the cam 16 rotates in the direction 21.

Moreover, according to the invention, the mobile frame 8 is equipped on the one hand with the first set of gear teeth 13 arranged circumferentially, forming at least one arc of a circle centered on the axis of rotation X, and oriented radially towards the centre of the hinge X, and on the other hand, at least one second set of gear teeth 50 forming at least one arc of a circle centered on the axis of rotation X, this second set of gear teeth 50 being oriented radially outwards and facing a cylindrical bearing 54 situated opposite in the fixed frame 7. Preferably, the first set of gear teeth 13 oriented radially inwards and the second set of gear teeth 50 oriented radially outwards are part of a ring 53 forming part of the mobile frame 8.

Still according to the invention and with particular reference to FIG. 3, the second set of gear teeth 50 comprises several arc-shaped sections centered on the axis X, separated angularly by smooth bearing surfaces 51, also arc-shaped, these bearing surfaces 51 resting slidably on the cylindrical bearing 54 forming part of the fixed frame 7.

The hinge mechanism that has just been described operates as follows. When the passenger in the seat 1 wishes to adjust the tilt of the backrest 4, he actuates the control lever 6 by rotating it in the angular direction 21, which unlocks the hinge mechanism 5 to allow the passenger to adjust the tilt of the backrest 4 by acting directly on this backrest, for example by pushing it backwards with his back, or conversely by allowing it to move forward under the effect of one or more springs inside this backrest (not shown), the relative position of the mobile frame 8 thus being altered in relation to the fixed frame 7.

Figure 5:
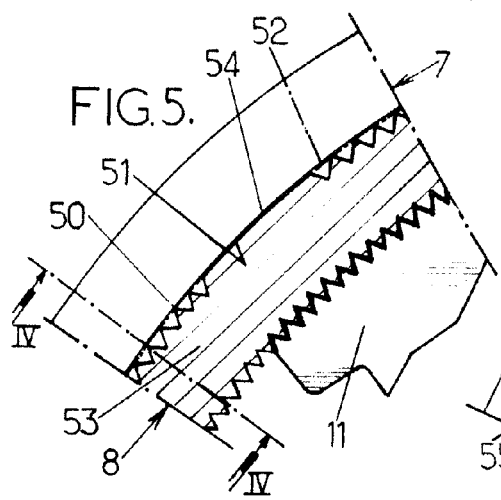
FIG. 5 is a detailed axial sectional view of the hinge mechanism of FIG. 3.

As can also be seen in FIGS. 4 and 5, in the normal event of angular adjustment of the backrest, the mobile frame 8 rotates in relation to the fixed frame 7, the bearing surfaces 51 sliding on the cylindrical bearing 54 of the fixed frame 7. The second set of gear teeth 50 does not interfere directly with the cylindrical bearing 54 in the event of normal use of the adjustment mechanism.

The bearing surfaces 51 define a circumscribed cylinder 52 and the radial points of the teeth of the second set of gear teeth 50 are situated on a circle the radius of which is smaller than or equal to the radius of the circumscribed cylinder 52 defined by the bearing surfaces 51.

Moreover, as long as the passenger does not actuate the control lever 6, the hinge mechanism 5 remains in the locked position. As the locking toothed components 11 have their teeth 12 engaged with the first set of gear teeth 13 of the mobile frame 8, the fixed frame and the mobile frame are thus mutually immobilized. This device for locking the movement of one frame in relation the other can withstand torques up to a certain predetermined limit value. As long as this limit is not exceeded, the locking toothed components 11 remain in their position locked against the first set of gear teeth 13 and the bearing surfaces 51 slide on the cylindrical bearing 54 without the second set of gear teeth 50 interfering with said cylindrical bearing 54, the ring 53 experiencing only minor deformations.

However, if the torque experienced by the locking device exceeds a certain predetermined limit value, the locking toothed components 11, the stop elements 14 and the ring 53 experience greater deformations.

In fact, when the vehicle experiences an accident while the hinge mechanism is in the locked position, the mobile frame 8 of the hinge mechanism can sometimes be subjected to a very high torque in one or other of the angular directions 20, 21, in this case the direction 21 in the example shown in FIG. 6. This torque can result for example from the inertia of the passenger in the event of an impact from the rear or in the event of a frontal impact if the safety belt of the seat has an upper anchorage point linked to the backrest, and/or from the impact of baggage situated behind the seat in the event of a frontal impact.

When this torque reaches a certain limit value, for example 100 or 150 daN/m (deca-Newton-meters) or more generally a limit value comprised between 50 and 200 daN/m (deca-Newton-meters), the locking toothed components 11 experience very significant forces in the circumferential direction, such that each of these components eventually plastically deforms the stop element 14 situated downstream in the direction in which the torque is exerted, in this case the direction 21. Such deformation is shown in FIGS. 6 and 7.

In the situation of an accident mentioned above, the locking toothed components 11 have a tendency to pivot on themselves under the effect of the high torque exerted by the mobile frame 8 and thus in the pressure zone 11a in FIG. 6 a radial pressure oriented outwards is exerted to push the ring 53 that forms part of the mobile frame 8 outwards. As a result, the ring 53 comprising the bearing surfaces 51 and the second set of gear teeth 50 is pushed outwardly against the cylindrical bearing 54 that forms part of the fixed frame 7. Said ring 53 is deformed under the outwardly-directed radial forces.

Figure 7:
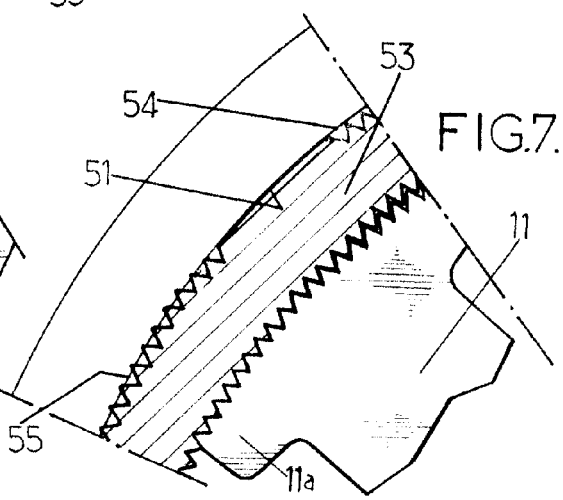
FIG. 7 is a view similar to that in FIG. 5, showing a part of the hinge mechanism after an accident experienced by the vehicle in which the seat is installed.

As the surface hardness of the frame 7 is lower than the surface hardness of the ring 53 and in particular the set of gear teeth 50, the radial points of the teeth of this set of gear teeth 50 enter the cylindrical bearing 54 of the fixed frame 7 as illustrated in detail in FIG. 7 (zone 55). This has the effect of considerably increasing the retention torque between the fixed frame 7 and the mobile frame 8 in order to avoid any relative movement of the backrest in relation to the seat base during the accident experienced by the vehicle.

In the embodiment of the invention, it is possible to use for example a surface heat treatment in the production of the mobile frame 8, in order to increase the surface hardness of the toothed surface. Conversely, the fixed frame 7 can be produced without any particular heat treatment and can be obtained by production methods known in the art such as by stamping.

Given the size of the contact surface between the bearing surfaces 51 and the cylindrical bearing 54, said bearing surfaces 51 cannot enter the cylindrical bearing 54.

One of the characteristics of the invention is to propose an inventive distribution of the sections of gear teeth 50 on the circumference of the ring 53, such that at least one locking toothed component 11, and preferably two locking toothed components 11, are situated opposite to a toothed section of the second set of gear teeth 50. A non-limitative example is shown in FIGS. 3 and 6: three locking components 11 are distributed at an angle of 120° and eight sections of gear teeth of the second set of gear teeth 50 are distributed at an angle of 45°.

Thus, in the event of an accident, at least two out of three pressure zones 11a of the locking components 11 are located opposite a toothed section of the second set of gear teeth 50.

Of course, a different number of locking components 11 and number of toothed sections of the second set of gear teeth 50 can be selected without departing from the scope of the present invention.

It is also understood that, without departing from the scope of the invention, the first frame 7 can be linked to the backrest 4 of the seat 1 and the second frame 8 can be linked to the seat base 2 of the seat 1.

The invention claimed is:

1. A hinge mechanism comprising:
   first and second frames mounted rotatably in relation to each other about an axis of rotation,
   a geared adjustment device connecting the first and second frames to each other, making it possible to adjust a relative angular position of said first and second frames, said adjustment device comprising:
   at least one first set of gear teeth integral with the second frame, and forming at least one arc of a circle centered on the axis of rotation,
   at least one first toothed component capable of engaging with said first set of gear teeth and mobile in relation to said first frame, between a locking position in which said first toothed component cooperates with the first set of gear teeth of the second frame in order to immobilize the first and second frames in relation to each other, and a retracted position in which said first toothed component does not interfere with the gear teeth of the second frame,
   and an actuation device capable of controlling the adjustment device,
   characterized in that the second frame comprises moreover at least one second set of gear teeth forming at least one arc of a circle centered on the axis of rotation and capable of interfering with the first frame, when the torque applied between the first and second frames exceeds a predetermined threshold in which the second set of gear teeth comprises several arc-shaped sections angularly separated by smooth arc-shaped bearing surfaces, said bearing surfaces resting slidably on a cylindrical bearing of the first frame and being capable of preventing the second set of gear teeth from interfering with the first frame, as long as the torque applied between the first and second frames is below said predetermined threshold.

2. A vehicle seat comprising a seat base and a backrest mounted pivotably in relation to the seat base by means of at least one hinge mechanism according to claim 1.

3. The hinge mechanism according to claim 1, in which the cylindrical bearing is rotatably mounted in a ring forming part of the second frame, said ring having a radially internal face that includes the first set of gear teeth and a radially external face that includes the second set of gear teeth said second set of gear teeth being capable of entering the cylindrical bearing under pressure exerted by the first toothed component when the torque applied between the first and second frames exceeds a predetermined threshold.

4. The hinge mechanism according to claim 3, in which the second set of gear teeth and the cylindrical bearing each have a surface hardness coefficient, the surface hardness coefficient of the cylindrical bearing being lower than the surface hardness coefficient of the second set of gear teeth.

5. The hinge mechanism according to claim 1, in which the bearing surfaces define and form part of a circumscribed cylinder having a first radius and the second set of gear teeth has radial points of teeth defining a circle having a second radius which is at most equal to the first radius.

6. The hinge mechanism according to claim 5, in which there are three first toothed components, spaced circumferentially and distributed at an angle of 120° degrees, and in which the bearing surfaces are spaced and distributed at an angle of 45° around the circumscribed cylinder.

7. The hinge mechanism according to claim 5, in which the second radius is equal to the first radius.

* * * * *